(12) United States Patent
Shreve et al.

(10) Patent No.: US 10,810,416 B2
(45) Date of Patent: Oct. 20, 2020

(54) METHOD AND SYSTEM FOR FACILITATING DYNAMIC MATERIALIZATION FOR REAL-WORLD INTERACTION WITH VIRTUAL REALITY

(71) Applicant: Palo Alto Research Center Incorporated, Palo Alto, CA (US)

(72) Inventors: Matthew A. Shreve, Mountain View, CA (US); Robert R. Price, Palo Alto, CA (US); Lester D. Nelson, Santa Clara, CA (US); James D. Glasnapp, San Francisco, CA (US)

(73) Assignee: Palo Alto Reseach Center Incorporated, Palo Alto, CA (US)

( * ) Notice: Subject to any disclaimer, the term of this patent is extended or adjusted under 35 U.S.C. 154(b) by 144 days.

(21) Appl. No.: 16/221,294

(22) Filed: Dec. 14, 2018

(65) Prior Publication Data
US 2020/0193150 A1 Jun. 18, 2020

(51) Int. Cl.
*G06K 9/00* (2006.01)
*G06T 19/00* (2011.01)

(52) U.S. Cl.
CPC ..... *G06K 9/00342* (2013.01); *G06K 9/00771* (2013.01); *G06T 19/006* (2013.01)

(58) Field of Classification Search
CPC ............ G06K 9/00342; G06K 9/00771; G06T 19/006
See application file for complete search history.

(56) References Cited

U.S. PATENT DOCUMENTS

| | | | |
|---|---|---|---|
| 5,936,606 A * | 8/1999 | Lie | G09G 5/02 345/629 |
| 2010/0159434 A1* | 6/2010 | Lampotang | G09B 23/30 434/365 |
| 2016/0191887 A1* | 6/2016 | Casas | H04N 13/279 348/47 |
| 2017/0097676 A1* | 4/2017 | Lazor | G06F 3/017 |
| 2017/0181802 A1* | 6/2017 | Sachs | G02B 27/017 |
| 2018/0284760 A1* | 10/2018 | Gupta | B25J 13/065 |
| 2018/0285631 A1* | 10/2018 | Murrish | G06F 3/016 |
| 2019/0026936 A1* | 1/2019 | Gorur Sheshagiri | G06T 7/70 |
| 2019/0133689 A1* | 5/2019 | Johnson | A61B 34/10 |

(Continued)

*Primary Examiner* — John B Strege
(74) *Attorney, Agent, or Firm* — Shun Yao; Park, Vaughan, Fleming & Dowler LLP

(57) ABSTRACT

One embodiment provides a method for facilitating real-world interaction with virtual reality. During operation, the system receives, by a computing device from a virtual reality device associated with a user, instructions to configure physical components, wherein for a first physical component at a first location, the instructions indicate a type and an orientation, and wherein for a second physical component located at a second location, the instructions indicate a type, a length of extension, and an angle. The system executes, by a pose-adjusting unit, the instructions, which involves: physically moving the first physical component to the indicated orientation at the first location; physically extending the second physical component from the second location by the indicated length; and physically rotating the extended second physical component by the indicated angle. The system renders, on the virtual reality device, the configured physical components.

20 Claims, 12 Drawing Sheets
(4 of 12 Drawing Sheet(s) Filed in Color)

(56) References Cited

U.S. PATENT DOCUMENTS

2019/0355278 A1\* 11/2019 Sainsbury .............. B25J 9/1666
2020/0008877 A1\* 1/2020 Jo ........................ A61C 9/0053
2020/0113637 A1\* 4/2020 Ida ........................ A61B 34/70

\* cited by examiner

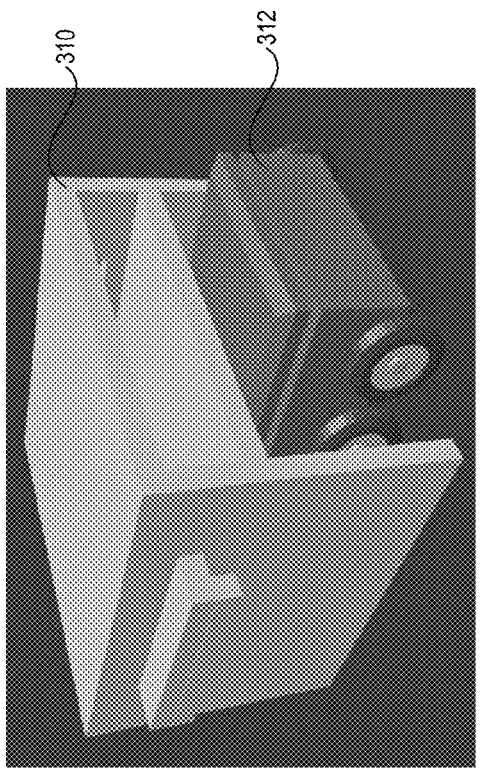
FIG. 3B
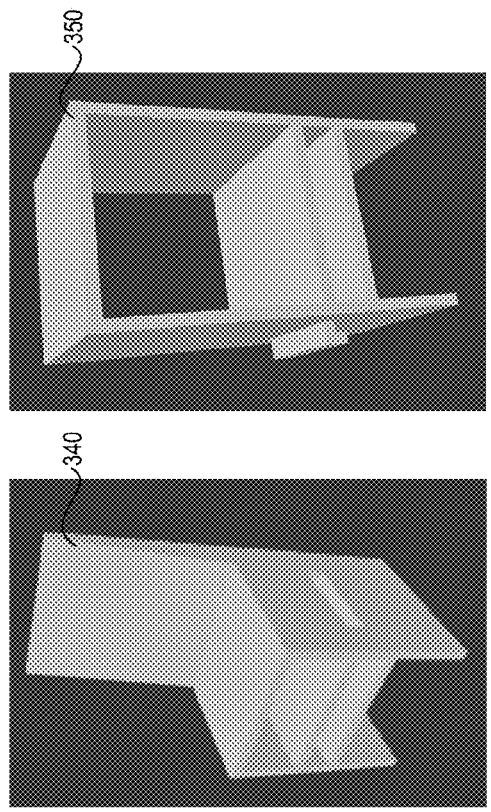
FIG. 3E
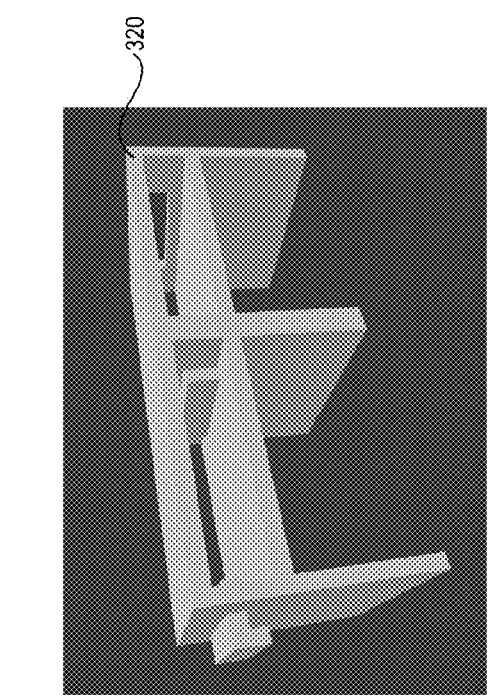
FIG. 3D
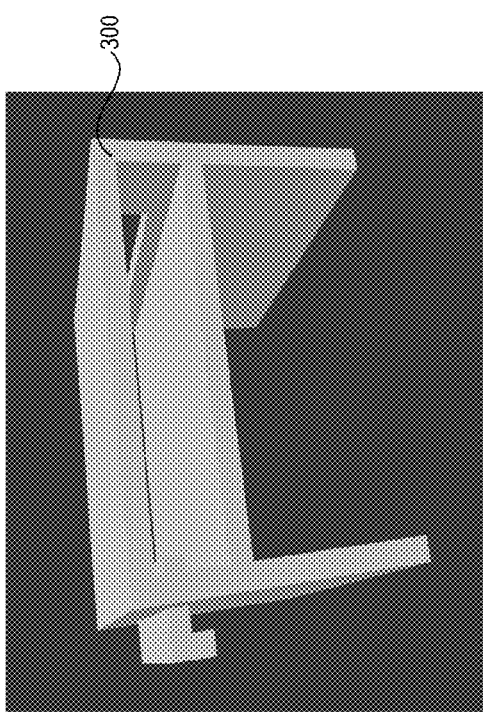
FIG. 3A
FIG. 3C

METHOD AND SYSTEM FOR FACILITATING DYNAMIC MATERIALIZATION FOR REAL-WORLD INTERACTION WITH VIRTUAL REALITY

BACKGROUND

Field

This disclosure is generally related to interaction with a virtual reality system. More specifically, this disclosure is related to a method and system for facilitating dynamic materialization for real-world interaction with virtual reality (VR).

Related Art

Virtual reality (VR) systems are growing in scale and usage, and can generate a high-impact visceral experience that can range from performing normal practical tasks (such as office work) to more complicated tasks (such as in the areas of education, training, and entertainment). However, one significant limitation in current VR systems is that the rendered imagery in VR scenes has no corresponding physical substance. Providing the physical form to VR scenarios can dramatically increase the utility of VR. For example, a user may wish to have physical steps or stairs to support an exercise regime, or an obstacle course with physical structures to support tactical mission training. For extended scenarios such as virtual meetings, a user may wish to sit on a physical chair and rest his hands on a physical table or other surface.

Current VR systems, including mixed reality (MR) systems and augmented reality (AR) systems, can use sensors and other feedback devices to identify physical objects which exist in a user's physical environment, and can render corresponding VR objects for the user. However, while current VR systems can render VR imagery based on sensing physical objects in the real world, current VR systems do not allow a user to create or configure objects in VR and to instantiate those VR objects in the physical world.

SUMMARY

One embodiment provides a system for facilitating real-world interaction with virtual reality. During operation, the system receives, by a computing device from a virtual reality device associated with a user, instructions to configure physical components, wherein for a first physical component at a first location, the instructions indicate a type and an orientation for the first physical component, and wherein for a second physical component located at a second location, the instructions indicate a type for the second physical component, a length of extension from the second location, and an angle between the second physical component and a surface associated with the second location. The system executes, by a pose-adjusting unit, the instructions, which involves: physically moving the first physical component to the indicated orientation at the first location; physically extending the second physical component from the second location by the indicated length; and physically rotating the extended second physical component by the indicated angle. The system renders, on the virtual reality device, the configured physical components.

In some embodiments, wherein prior to receiving the instructions to configure the physical components: the first physical component is installed or mounted at the first location in a physical space; and the second physical component is installed at the second location in the physical space.

In some embodiments, the instructions are sent by the virtual reality device and are sent in response to the user moving, using the virtual reality device, virtual reality objects which correspond to the physical components.

In some embodiments, the instructions further indicate features for the physical components based on the type for the physical components. Rendering the configured physical components involves rendering, on the virtual reality device, the included features for the physical components. The instructions further indicate sensory information to be produced via a sensory-generating device associated with a physical space. The physical space is associated with the physical components and includes one or more of a speaker, an aroma generator, a vibration generator, and a device which can change or control a temperature, humidity, or light content of the physical space. The system produces, by the sensory-generating device, the indicated sensory information.

In some embodiments, the first physical component and the second physical component are located in a physical space. For a set of third physical components which are mobile components, the instructions indicate a type, a source location, a target location, and an orientation for a respective mobile component. The system executes, by a mobile robotic device, the instructions, which involves physically moving the respective mobile component from the indicated source location to the indicated target location.

In some embodiments, the source location and the target location are one or more of: a location in the physical space; and a location which is in a second physical space distinct from the physical space.

In some embodiments, the system determines an order in which the mobile components are to be moved by the mobile robotic device to each respective indicated target location. The system determines a trajectory by which the mobile robotic device is to move each mobile component to a respective indicated target location. Physically moving the respective mobile component from the indicated source location to the indicated target location is based on the order and a respective trajectory.

In some embodiments, the system tracks, by the computing device based on sensors associated with the physical space, a current location and a current orientation of: the mobile robotic device; the user; other users in the physical space; the first physical component; the second physical component; and the mobile components.

In some embodiments, the sensors include one or more of: cameras mounted in a fixed position on the walls, floor, ceiling, or other surface of the physical space; moveable cameras in the physical space; sensors associated with or worn by the user; and any sensor or device which can monitor movement of any physical component, object, or user in the physical space.

In some embodiments, the system dynamically re-configures the physical components, which involves the following operations. The system receives, by the computing device from the virtual reality device, instructions to re-configure the physical components, which include the first physical component, the second physical component, and the mobile components. The system identifies a current location and a current orientation of: the mobile robotic device; the user; other users in the physical space; the first physical component; the second physical component; and the mobile components. The system determines, based on the instructions to re-configure the physical components, an order in which: the first physical component is to be physically moved by the pose-adjusting unit; the second physical components is to be physically extended and physically rotated by the pose-adjusting unit; and the mobile components are to be physically moved by the mobile robotic device. The system determines a trajectory by which the mobile robotic device is to move each mobile component. The system calculates a period of time in which to execute the instructions to re-configure the physical components. The system directs the user to move to a new location for the period of time. The system renders, on the virtual reality device, a visual cue corresponding to an area of the physical space associated with the physical components to be re-configured. In response to confirming that the user has moved to the new location, the system executes, by the pose-adjusting unit and by the mobile robotic device, the instructions to re-configure the physical components based on the order and the trajectory. The system notifies the user when the instructions to re-configure the physical components have been completed.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 3A illustrates an exemplary materialization prop, in accordance with an embodiment of the present application.

FIG. 3B illustrates an exemplary materialization prop with a mobile robotic device, in accordance with an embodiment of the present application.

FIG. 3C illustrates an exemplary cross-linked materialization prop, in accordance with an embodiment of the present application.

FIG. 3D illustrates an exemplary materialization prop, in accordance with an embodiment of the present application.

FIG. 3E illustrates an exemplary materialization prop, in accordance with an embodiment of the present application.

In the figures, like reference numerals refer to the same figure elements.

DETAILED DESCRIPTION

Figure 1A:
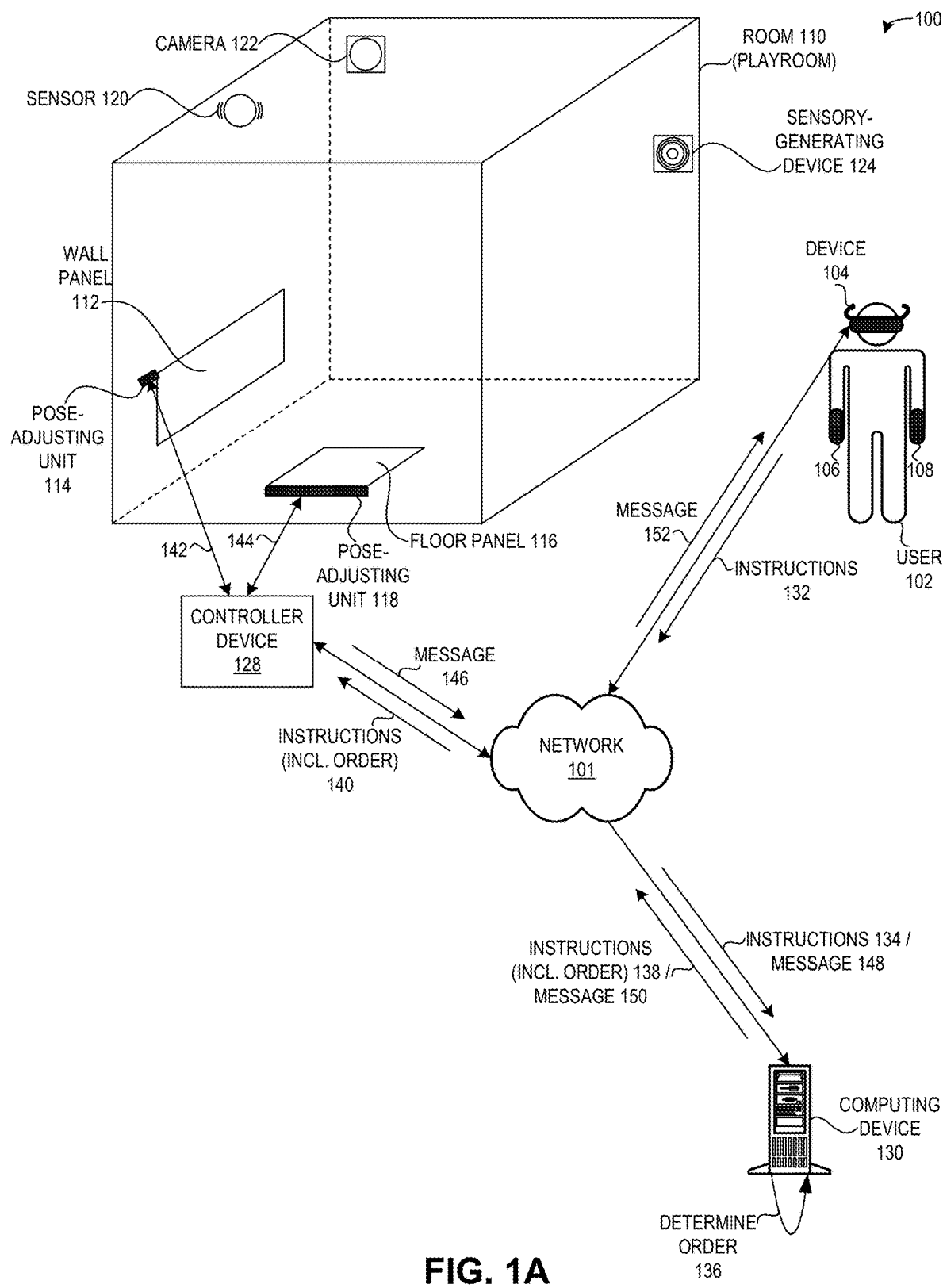
FIG. 1A illustrates an exemplary environment for facilitating real-world interaction with virtual reality, including pose-adjusting units associated with physical components, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of instantiating physical objects in the real world based on interactions in virtual reality.

As described above, one significant limitation in current VR systems is that the rendered imagery in VR scenes has no corresponding physical substance. Providing the physical form to VR scenarios can dramatically increase the utility of VR. For example, a user may wish to have physical steps or stairs to support an exercise regime, or an obstacle course with physical structures to support tactical mission training. For extended scenarios such as virtual meetings, a user may wish to sit on a physical chair and rest his hands on a physical table or other surface. While current VR systems can render VR imagery based on sensing physical objects in the real world, current VR systems do not allow a user to create or configure objects in VR and to instantiate corresponding physical objects for those VR objects in the physical world.

The embodiments described herein solve this problem by providing a system which allows for dynamic materialization of physical objects based on a user's interactions in virtual reality. The system can include a pre-configured physical space, such as a room, which can include physical components and associated pose-adjusting units, which can change the position and orientation of a respective physical component. A first physical component can be, e.g., a wall panel or a floor panel which is installed or mounted at a first location in a room or other physical space. The pose-adjusting unit for the first physical component can be, e.g., a lever or other actuating mechanism, as described below in relation to FIGS. 1A and 2A. A second physical component can be, e.g., a floor panel which is installed flush to the ground and which can be raised out of a slot in the ground and subsequently rotated. The pose-adjusting unit for the second physical component can be, e.g., a hydraulics-based component which can move the physical component in six degrees of freedom, as described below in relation to FIGS. 1A and 2B.

A user, using a VR device, can "configure" a room and physical components within the room by providing instructions using his VR device, e.g., by using a VR headset and a corresponding hand-tracking device to place a couch or a table at a particular location associated with the pre-configured physical components. The user can specify the orientation of the physical components to be configured. The system can send the instructions to the pose-adjusting units, which can physically move, extend, and/or rotate the physical components based on parameters indicated in the instructions (e.g., orientation, length of extension, angles between various surfaces, etc.). The system can subsequently render, on the VR device, the configured physical components, e.g., as a couch, a bench, or other surface.

Furthermore, the system can include a variety of mobile physical components ("materialization props," such as a chair, a lamp, a coffee table, etc.) These mobile components may be located in a same or a different physical space as the first and second physical components. The user, using the VR device, can further configure the room by providing instructions to include one or more mobile components at various locations and orientations in the room. A mobile robotic device, such as a shuttlebot, can retrieve the requested mobile components, determine an order in which to place the mobile components in the room, and determine a trajectory by which to move each mobile component. For example, the shuttlebot can physically move each mobile component from the indicated source location to the indicated target location based on the order and the trajectory, as described below in relation to 1B, 1C, 3A-3E, and 4A-4B. The system can subsequently render the configured mobile components on the VR device, e.g., as rendered VR imagery/objects in the VR scene.

In addition, the system can track the physical components in the room (in real-time using, e.g., sensors or cameras in the room), and can dynamically re-configure the room and the physical components in the room based on instructions received from the user. For example, the system can track the current location and orientation of the mobile robotic device, the user, other users in the same physical space, the first physical component, the second physical component, and the mobile components. The user, using the VR device, can re-configure the room by providing instructions to re-configure the physical components, and the system can perform the above-described operations on the physical components. The system can subsequently render, on the VR device, the re-configured physical components, as described below in relation to FIGS. 5C and 5D.

Thus, the embodiments described herein provide a technological solution to the technological problem of using VR to instantiate physical objects in the real word, e.g., dynamic materialization of physical objects based on a user's interactions in virtual reality. The technological solution allows the user, using a VR device, to specify a layout of physical components which are pre-configured in a physical space, place mobile physical components in the room, view the configured physical components as rendered on the user's VR device, and interact with the configured physical components, which have been dynamically materialized based on the user's instructions to configure or re-configure the physical space. Thus, the user can interact with the real world while in a VR environment by instantiating physical objects in the real world through his VR device. The system can include the pre-configured physical components (such as a wall panel which can be lowered from the wall, or a floor panel which can be raised from the floor) as well as mobile components (which can be retrieved and placed by a mobile robotic device). Thus, the described embodiments provide an improvement to and an enhancement of the technological field of real-world interaction with virtual reality.

The term "physical space" can include a room or any physical space whose boundaries can be defined, and in which a physical component can be pre-configured at a location (e.g., installed or mounted), and in which a mobile physical component can be placed in an orientation at another location.

The term "pose-adjusting unit" refers to a device, component, or unit which can adjust, rotate, extend, or move an associated physical component. Examples of a pose-adjusting unit include: a robotic arm; a lever; a device based on hydraulics, levers, gears, or pulleys; and a device which can move with six degrees of freedom.

The term "mobile robotic device" refers to a device which can receive instructions or commands to move from a first location to a second location. In this disclosure, a mobile robotic device can also retrieve and move a mobile physical component from a source location to a target location. An example of a mobile robotic device is a shuttlebot with a base which can turn in place and provide 360 degrees of motion.

The term "physical component" refers to a physical component, which can be attached, activated, actuated, or acted upon by a pose-adjusting unit or moved by a mobile robotic device. The term "mobile physical component" or "mobile component" refers to a physical component which can be retrieved, moved, and placed by a mobile robotic device.

Exemplary Environment and Communication

FIG. 1A illustrates an exemplary environment 100 for facilitating real-world interaction with virtual reality, including pose-adjusting units associated with physical components, in accordance with an embodiment of the present application. Environment 100 can include a physical space, such as a room 110 ("playroom"), which can include various physical components, including: a wall panel 112; an associated pose-adjusting unit 114; a floor panel 116; an associated pose-adjusting unit 118; a sensor 120; a camera 122; and a sensory-generating device 124. Environment 100 can also include a controller device 128; a user 102 with associated devices 104, 106, and 108; and a computing device 130. Controller device 128 can communicate with pose-adjusting units 114 and 118. Associated devices 104-108 can be virtual reality devices which render a VR environment for user 102. Computing device 130 can be a server, machine, or other device(s) which can perform the operations described herein. Computing device 130, controller device 128, and user 102 (via associated devices 104-108) can communicate with each other over a network 101. The below description refers only to the VR device 104, but may also include data/instructions generated by or received from VR devices 106 and 108.

During operation, user 102 can configure room 110 and the physical components in the room, such as wall panel 112 and floor panel 116. Using VR device 104, user 102 can instantiate physical objects by placing VR objects in a particular location and at a particular orientation. VR device 104 can generate and send to computing device 130 instructions 132 to configure the physical components. Computing device 130 can receive instructions 132 (as instructions 134). Instructions 134 can include parameters relating to the physical component to be configured, including a type, an orientation, a length of extension from a location, and an angle between a component and a surface associated with a location.

Upon receiving instructions 134, computing device 130 can determine an order in which to move the physical components (function 136), and send to controller device 128 instructions (including the order) 138. Controller device 128 can receive instructions 138 (as instructions 140), and can send, based on the determined order, to each of pose-adjusting units 114 and 116 instructions to configure the associated physical component. The instructions sent via, respectively, communications 142 and 144, can be based on parameters received in instructions 140 (as initially sent by user 102 in instructions 132). For example, if the instructions indicate an orientation with an angle of 90 degrees for wall panel 112, pose-adjusting unit 114 can physically move wall panel 112 to the indicated orientation, e.g., by lowering a physical arm or lever coupled to wall panel 112. If the instructions indicate a length of extension of 3 feet and an angle of 100 degrees for floor panel 116, pose-adjusting unit 118 can physically raise or extend floor panel 116 by 3 feet from the floor and physically rotate extended floor panel 116 by the indicated angle of 100 degrees.

Controller device can send to computing device 130 a message 146 which indicates a status of the completion of instructions 140. Computing device 130 can receive message 146 (as message 148), and can send a corresponding message 150 to device 104. Device 104 can receive message 150 (as message 152), and can subsequently render the configured physical components, which allows user 102 to interact physically with the dynamically placed physical components in the room while in the virtual reality environment (i.e., using device 104).

Device 104 can render the configured physical components based on other parameters set by user 102, including: a color; a pattern; a texture; and any other feature which can be configured and visually displayed as associated with a given physical component. For example, a configured seating surface can be displayed as being constructed of an expensive and rare wood, such as bocote or bubinga. In some embodiments, the physical components can be physically pre-configured with various textures or padding, which can increase the impact of the user's visceral experience, thus enhancing the user's real-world interaction in VR.

Figure 1B:
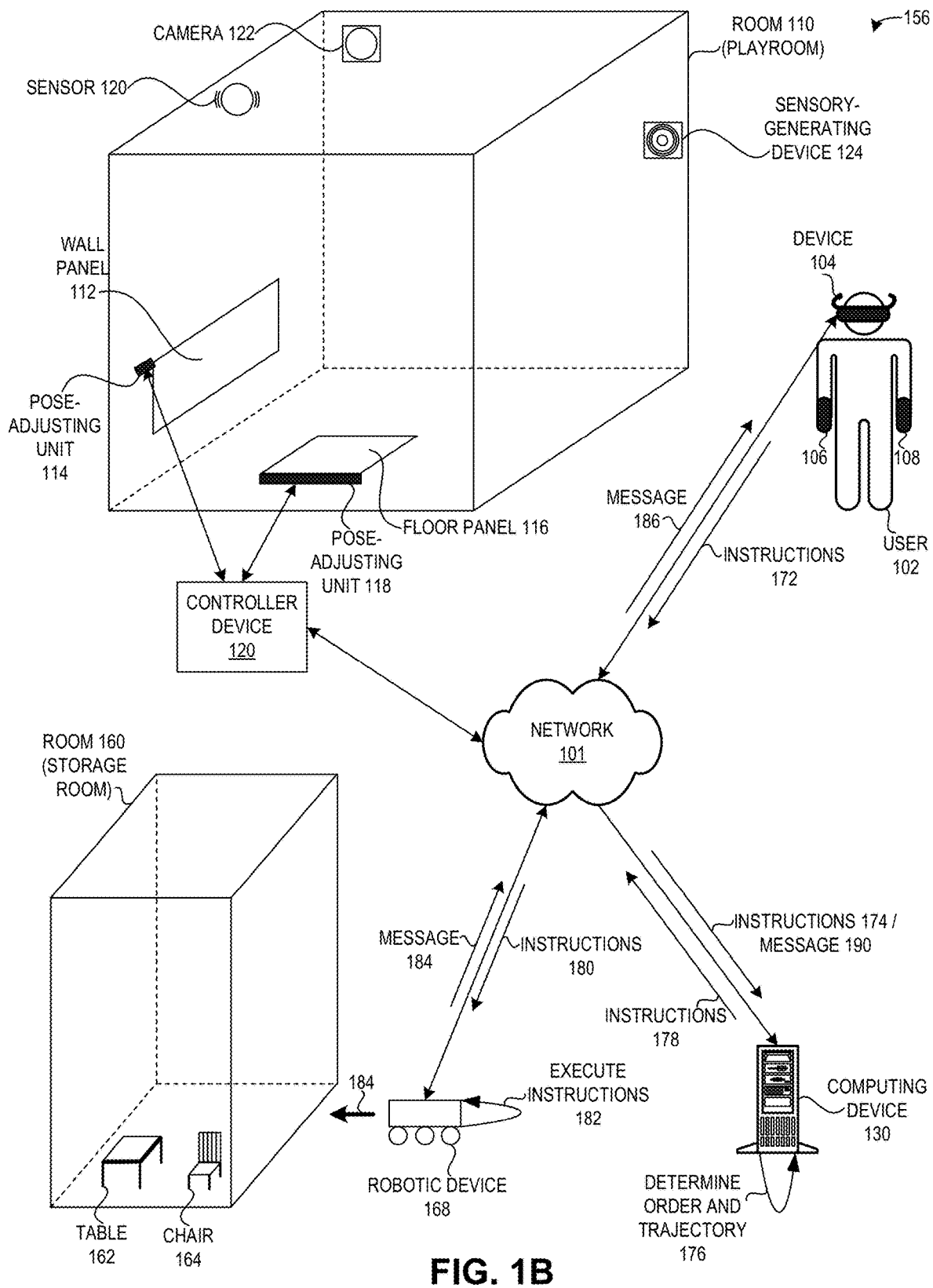
FIG. 1B illustrates an exemplary environment for facilitating real-world interaction with virtual reality, including a mobile robotic device which moves physical components, in accordance with an embodiment of the present application.

FIG. 1B illustrates an exemplary environment 156 for facilitating real-world interaction with virtual reality, including a mobile robotic device 168 which moves physical components, in accordance with an embodiment of the present application. Environment 156 is similar to environment 100 of FIG. 1A, and can further include another physical space, such as a room 160 ("storage room"), which can store or house various mobile physical components ("mobile components"). For example, room 160 can store a table 162 and a chair 164. Environment 100 can also include a mobile robotic device 168 ("robotic device 168"), which can be configured as a device on wheels, on a track, or other system of movement, and which can retrieve and move mobile components from one location to another location. Specifically, robotic device 168 can move mobile components from one physical space (e.g., room 160) to another physical space (e.g., room 110). Robotic device 168 can also be configured to pick up one or more mobile components at one time.

During operation, user 102 can use VR device 104 to configure room 110 and the physical components in the room (as described above in relation to FIG. 1A). User 102 can also use VR device 104 to place mobile components into the room at specific locations and orientations. VR device 104 can generate and send to computing device 130 instructions 172 to configure the mobile components. Server 130 can receive instructions 172 (as instructions 174). The instructions can include parameters relating to the mobile component to be configured, including a type, a source location, a target location, and an orientation.

Upon receiving instructions 174, computing device 130 can determine an order in which the mobile components are to be moved by robotic device 168 to a respective target location, and can also determine a trajectory by which robotic device 168 is to move each mobile component to its respective target location (function 176). In some embodiments, computing device 130 can determine the order in which both the mobile components are to be moved by robotic device 168 and the pre-configured physical components are to be moved/extended/rotated by the pose-adjusting units. Computing device 130 can send to robotic device 168 the instructions 178 (including the order and the trajectory. Robotic device 168 can receive instructions 178 (as instruction 180), and can execute the instructions (function 182) based on the order and trajectory provided by server 130 in instructions 180. That is, robotic device 168 can go to the indicated source location of the requested mobile component(s) (e.g., in the storage room), pick up the requested mobile component(s), travel to the playroom, and place the requested mobile component(s) in the indicated target location in the playroom. Robotic device 168 can communicate with computing device 130 to obtain updated instructions (not shown) if certain mobile components cannot be picked up from the source location, moved to the room, and placed in the target location according to an initially received set of instructions.

For example, instructions 180 can indicate that chair 164 is to be moved from a source location in room 160 to a target location at a specific orientation in room 110. Robotic device can go to room 160, taking a physical path 184, and retrieve chair 164. In some embodiments, robotic device 168 can be a shuttlebot which moves underneath a mobile component, and, when properly positioned, can use a flat surface which can be raised to lift, carry, move, or transport the mobile component.

Figure 1C:
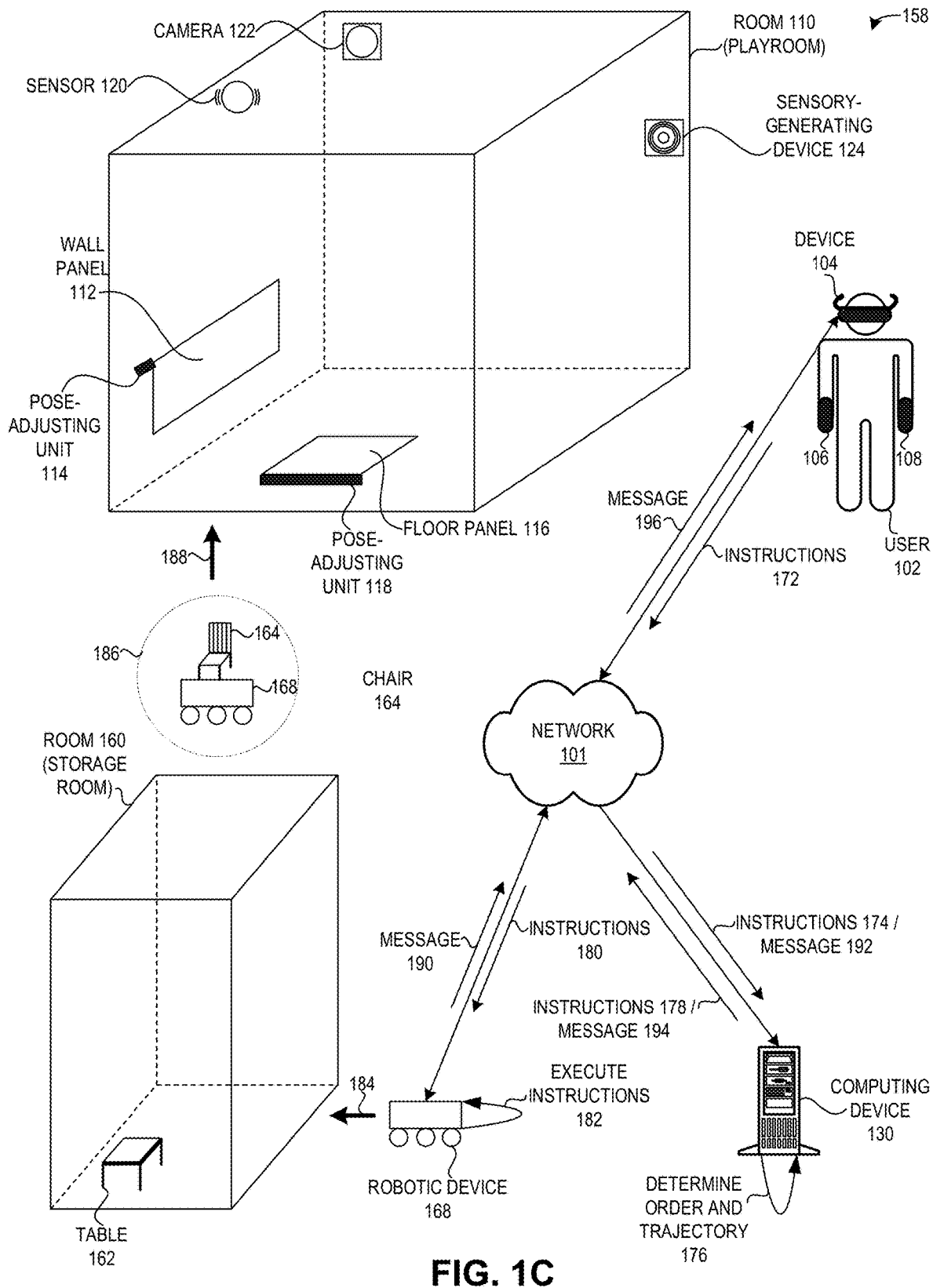
FIG. 1C illustrates an exemplary environment for facilitating real-world interaction with virtual reality, including a mobile robotic device which moves physical components, in accordance with an embodiment of the present application.

FIG. 1C illustrates an exemplary environment 158 for facilitating real-world interaction with virtual reality, including a mobile robotic device which moves physical components, in accordance with an embodiment of the present application. Environment 158 is similar to environment 156 of FIG. 1B, and depicts in a dotted circle 186 how robotic device 168 has retrieved chair 164 from room 160. Robotic device 168 can move or transport chair 164 to room 110, taking a physical path 188, and place chair 164 in the indicated location and orientation, as described below in relation to FIGS. 4A and 4B.

Upon successfully executing instructions 180, e.g., by moving chair 164 to the indicated target location and orientation in room 110, robotic device 168 can send to computing device 130 a message 190 which indicates a status of the completion of instructions 180. Computing device 130 can receive message 190 (as message 192), and can send a corresponding message 194 to device 104.

Device 104 can receive message 194 (as message 196), and can subsequently render the configured physical components, which allows user 102 to interact physically with the dynamically placed mobile components in the room while in the virtual reality environment (i.e., using device 104).

Furthermore, in environments 100, 156, and 158, the instructions sent by user 102 (using device 104) can also indicate sensory information to be produced via sensory-generating device 124, and in executing the instructions, the system can produce, by sensory-generating device 124, the indicated sensory information. Examples of sensory-generating device 124 can include, e.g.: a speaker; an aroma generator; a vibration generator; and a device which can change a temperature, humidity, or light content of a physical space associated with the physical components. As a further example, the light content can be based on a color temperature measured in Kelvin (e.g., incandescent, halogen, fluorescent, LED). In some embodiments, the VR device can control the light content in the VR space, and in others, a sensory-generating device can control the light content in the physical space.

Moreover, using sensors associated with the physical space (e.g., sensor 120 and camera 122), the system can track a current location and a current orientation of: robotic device 168; user 102; other users in room 110; wall panel 112; floor panel 116; and any mobile components in room 110 (such as chair 164). Example of sensors can include, e.g.: cameras mounted in a fixed position on the walls, floor, ceiling, or other surface of the physical space; moveable cameras in the physical space; sensors associated with or worn by the user; and any sensor or device which can monitor movement of any physical component, object, or user in the physical space. By using sensors to track the physical components and the users in the room, the system allows a user to dynamically re-configure the room (by sending instructions via the VR device, as described in relation to FIGS. 1A, 1B, and 1C). The system also allows the user to physically move a mobile component in the room, which movement and final placement in the room can be rendered in real-time on the VR device. Dynamically re-configuring a room is described below in relation to FIGS. 5C and 5D.

Exemplary Physical Space and Corresponding Rendering in VR/AR

Figure 2A:
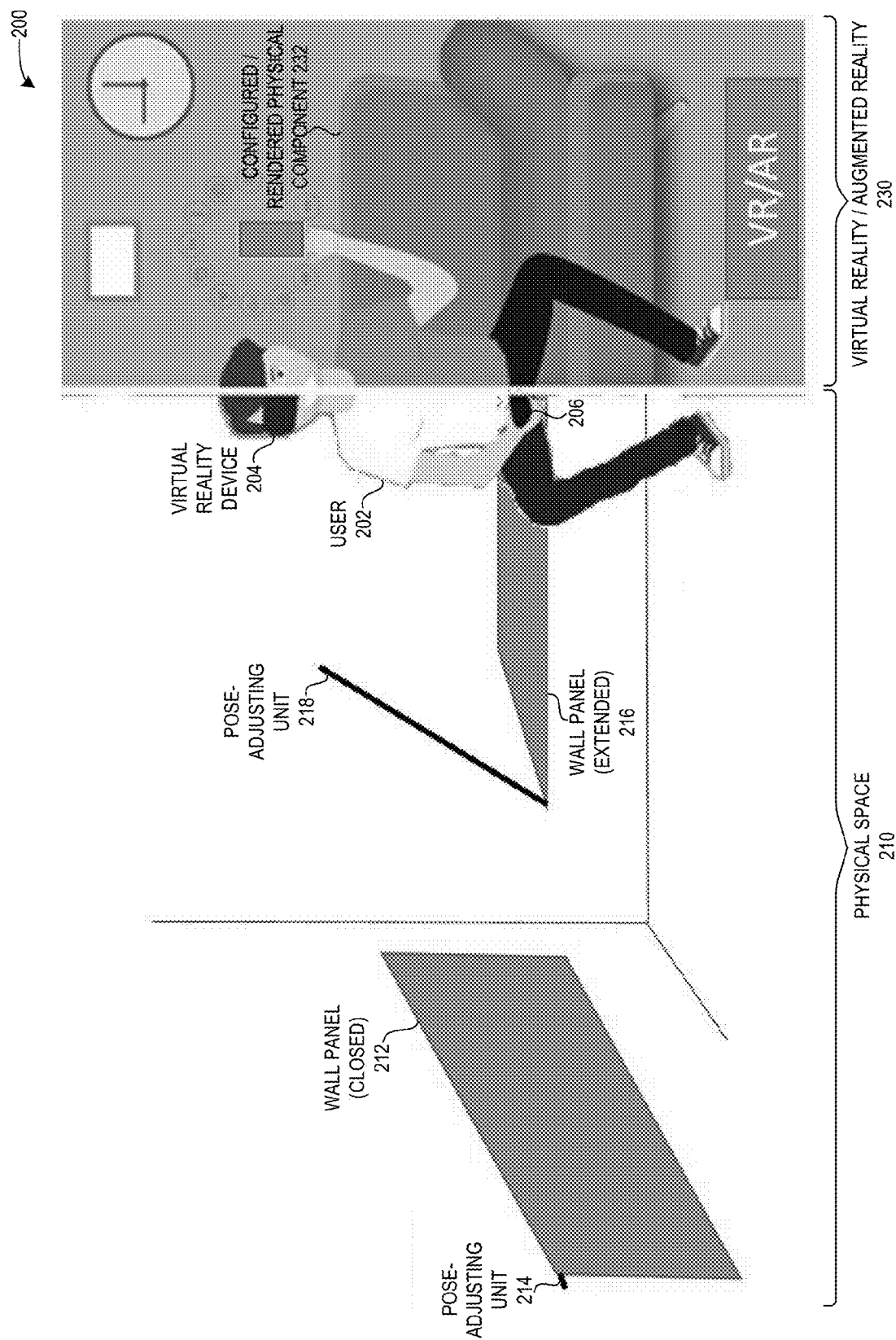
FIG. 2A illustrates an exemplary environment for facilitating real-world interaction with virtual reality, including a view of a physical space in the world and a corresponding view in virtual reality/augmented reality, in accordance with an embodiment of the present application.

FIG. 2A illustrates an exemplary environment 200 for facilitating real-world interaction with virtual reality, including a view of a physical space in the world and a corresponding view in virtual reality (VR)/augmented reality (AR), in accordance with an embodiment of the present application. Environment 200 can include a physical space 210 and a VR/AR space 230. Physical space 210 can include physical components and corresponding pose-adjusting units, such as: a wall panel 212 (depicted in a closed position, flat or flush against a wall); a corresponding pose-adjusting unit 214; a wall panel 216 (depicted in an extended position at a 90 degree angle from a wall); and a corresponding pose-adjusting unit 218.

After user 202 configures the room and the physical components within the room (using a virtual reality device 204, and optionally a virtual reality device 206, as described above in relation to FIG. 1A), user 202 can be seated on the surface of extended wall panel 216, which is rendered in VR/AR 230 as a couch (i.e., a configured/rendered physical component 232).

Figure 2B:
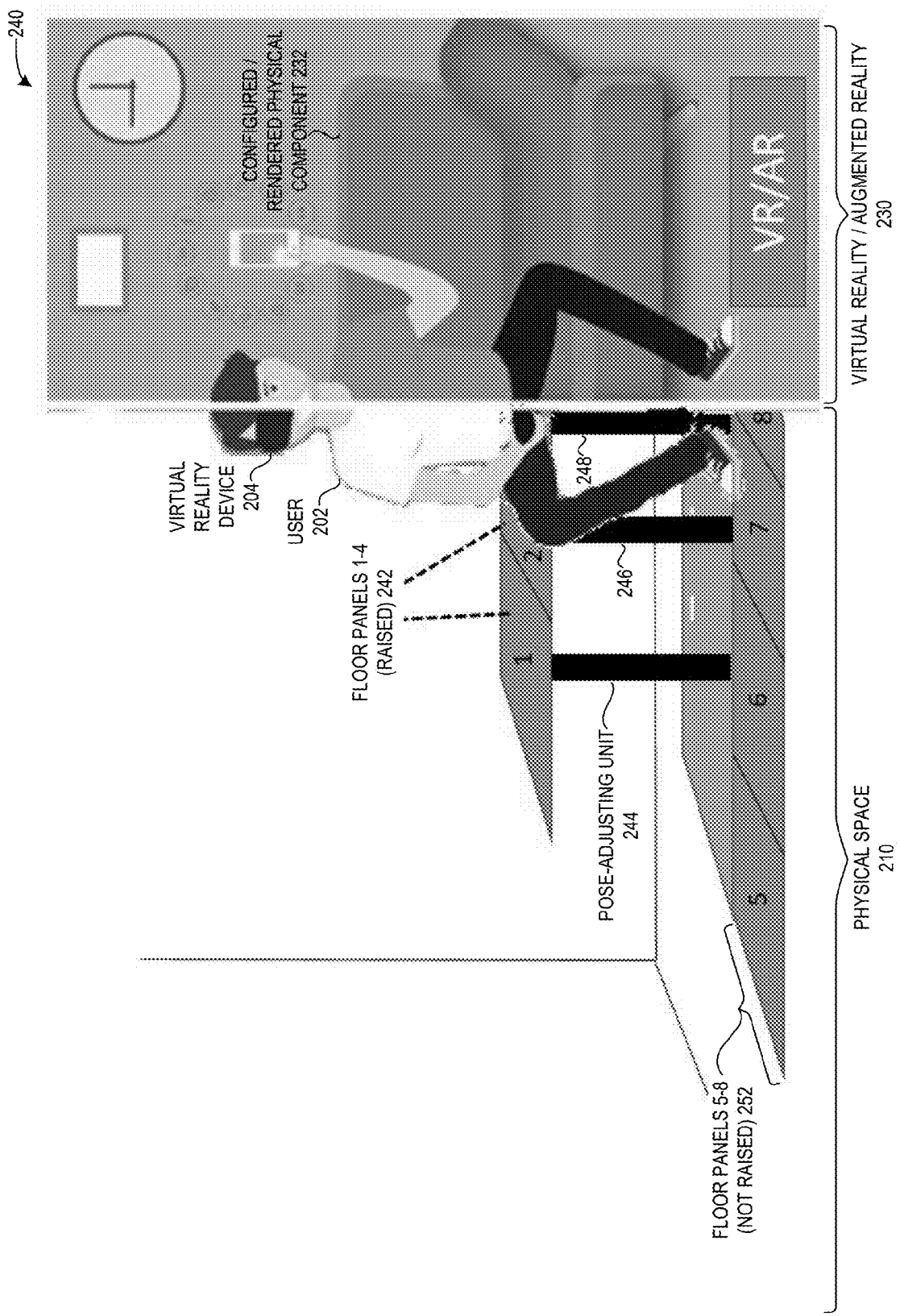
FIG. 2B illustrates an exemplary environment for facilitating real-world interaction with virtual reality, including a view of a physical space in the world and a corresponding view in virtual reality/augmented reality, in accordance with an embodiment of the present application.

FIG. 2B illustrates an exemplary environment 240 for facilitating real-world interaction with virtual reality, including a view of a physical space in the world and a corresponding view in virtual reality/augmented reality, in accordance with an embodiment of the present application. In environment 240, physical space 210 can include physical components and corresponding pose-adjusting units, such as: floor panels 1-4 242 (depicted in a raised position, at a 90 degree angle to the floor); corresponding pose-adjusting units 244, 246, and 248 (corresponding, respectively, to floor panels 1, 2, and 3); and floor panels 5-8 (depicted in a not raised position, flat or flush along the surface of the floor). Corresponding pose-adjusting units for floor panels 5-8 may be in the ground underneath floor panels 5-8, and are thus not depicted in physical space 210 of environment 240. A corresponding pose-adjusting unit for floor panel 4 is not shown in physical space 210, but can be beneath raised floor panel 4 which instantiates the rendered portion of the VR couch 232 shown in VR/AR 230.

After user 202 configures the room and the physical components within the room (using virtual reality device 204, and optionally virtual reality device 206, as described above in relation to FIG. 1A), user 202 can be seated on the surface created by raised floor panels 1-4 242, which is rendered in VR/AR 230 as a couch (i.e., a configured/rendered physical component 232).

Thus, environments 200 and 240 of, respectively, FIGS. 2A and 2B, depict how the system allows a user to instantiate physical objects based on instructions generated in a VR world, and how the system can provide a dynamic materialization of physical components which allows the user to perform real-world interaction while using or in VR.

Exemplary Mobile Components ("Materialization Props")

FIG. 3A illustrates an exemplary materialization prop 300, in accordance with an embodiment of the present application. Prop 300 can be a table, a coffee table, desk, or other physical component or physical object which can be used to instantiate a configured physical component via a VR device. Prop 300 can include a moveable, cross-linkable platform on which many different props may be designed.

FIG. 3B illustrates an exemplary materialization prop 310 with a mobile robotic device 312, in accordance with an embodiment of the present application. Mobile robotic device 312 can be a shuttlebot, which can slide under the materialization base of prop 310, raise its elevator-like platform to lift the materialization base of prop 310, and subsequently move prop 310 to an indicated or requested position and orientation.

FIG. 3C illustrates an exemplary cross-linked materialization prop 320, in accordance with an embodiment of the present application. Prop 320 can include two props which are cross-linked together (e.g., two of prop 300). The two props which form prop 320 can thus create a more massive structure. One prop may be raised and lower onto another prop in order to form cross-linked prop 320. The mobile robotic device can first link multiple props and then move them into place, or the mobile robotic device can move each prop one by one to its indicated location, and then place them into the cross-linked position. The order and trajectory determined by the system can include specific instructions on how and when to move and/or cross-link multiple materialization props.

The material props may include several variations which can provide critical functions such as a chair back, a table surface, a cupboard, or a platform for climbing on. For example, FIG. 3D illustrates an exemplary materialization prop 320, in accordance with an embodiment of the present application. Prop 320 can approximate or instantiate a chair as a mobile physical component with which the user can interact in the real world while in VR. As another example, FIG. 3E illustrates an exemplary materialization prop 350, in accordance with an embodiment of the present application. Prop 350 can approximate or instantiate a climbable platform as a mobile physical component with which the user can interact in the real world while in VR.

Mobile Component-Based Dynamic Materialization for Real-World Interaction with Virtual Reality In the embodiments described herein, the system can provide a layout scheduler, a motion planner, and a navigation and tracking module. The system can also provide dynamic re-configuration of the room and the physical components in the room.

Layout Scheduler:

The user can specify the type, location, and orientation of objects to be materialized. However, the materialization props must be introduced in a specific order so that props placed first do not obstruct or block the mobile robotic device from moving later props into place. The system provides a layout scheduler which can determine the order in which the mobile components are to be moved by a mobile robotic device in order to create a conflict-free plan. In some embodiments, the determined order can also include and incorporate the order in which the pre-configured props (of FIGS. 1A, 2A, and 2B) are to be moved to maintain the conflict-free plan, e.g., so that a raised floor panel does not prevent the mobile robotic device from subsequently placing a mobile component in its target location. Because the materialization props are about the same size, the system can use a discretized space Stanford Research Institute Problem Solver (STRIPS) planner for efficiency, which allows the system to complete the abstract schedule without the details of motion planning.

Motion Planner:

Once the materialization props have been scheduled for placement, the system can run a motion planner to generate trajectories for the mobile robotic device. The mobile robotic device requires a first trajectory to obtain the indicated prop (e.g., from its source location) and a second trajectory to move the prop (e.g., to its target location). The mobile robotic device also needs to move out of the scenario area once the scene is set. The system can use a generic motion planner to determine the needed trajectories, which can be a relatively simple planner given a holonomic shuttlebot base that can turn in place (either as the entire shuttlebot rotating in place on wheels with 360 degrees of motion, or as a base on the shuttlebot which base can be raised and can also rotate in place with 360 degrees of motion).

Navigation and Tracking Module:

Once the motion plan has been generated, the system must track the location and orientation of the props (including the pre-configured props and the mobile components), the mobile robotic device, the user, and any other users in the physical space, scene, or room. Traditional ego-centric simultaneous localization and mapping (SLAM) systems may easily suffer from occlusion, which can make it difficult to estimate position. If the system operates in the confines of a small space, such as a room, the system can use external trackers based on overhead cameras. Alternatively, the system can use radio-frequency (RF) positioning based on a system such as Polhemus. The system can also use other sensors associated with the physical space, including but not limited to: cameras mounted in a fixed position on the walls, floor, ceiling, or other surface of the physical space; moveable cameras in the physical space; sensors associated with or worn by the user; and any sensor or device which can monitor movement of any physical component, object, or user in the physical space.

Dynamic Re-Configuration:

Once the system has configured a scene for the user, the user may decide to re-configure the scene, which results in the system performing a scene transition. Recall that the navigation and tracking module can track the current location and orientation of the physical components (including the pre-configured props and the mobile components), the mobile robotic device, the user, and any other users in the physical space. Thus, the system can communicate and coordinate with the user(s) to suggest where the user should go during the scene transition, e.g., a message that instructs or notifies the user to sit in a particular chair for an estimated period of time. The system can calculate the estimated period of time based on the order and trajectories determined by the layout scheduler and the motion planner, and include that estimated period of time in the notification to the user. The system can also render, in the VR space in an area corresponding to the physical components which are being re-configured, visual cues (such as smoke, fog, a colored indicator, a mist-like shadow, or a cloud) to indicate to the user the area which is to be avoided by the user during this time, i.e., the area in which the physical components are being moved in response to instructions from the user to re-configure the room and the physical components in the room.

In some embodiments, instead of laying out VR objects to be instantiated in the real world and subsequently rendered in VR, the user can dynamically re-configure the room by physically moving a physical component, and the system can dynamically render, in real-time, the physical component as it is being moved by the user. For example, given a physical space with several chairs and a table (as in FIGS. 4A and 4B), rendered in VR as outdoor patio furniture, the user can be sitting on a chair. The user can slide or shuffle his chair closer to the table. Using the navigation and tracking module, the system can track the movement of all the physical components and users in the room, including the chair and the user. The system can dynamically, in real-time, render VR imagery which corresponds to the chair being moved by the user.

Exemplary Layout of Physical Space and Rendered VR Space

Figure 4A:
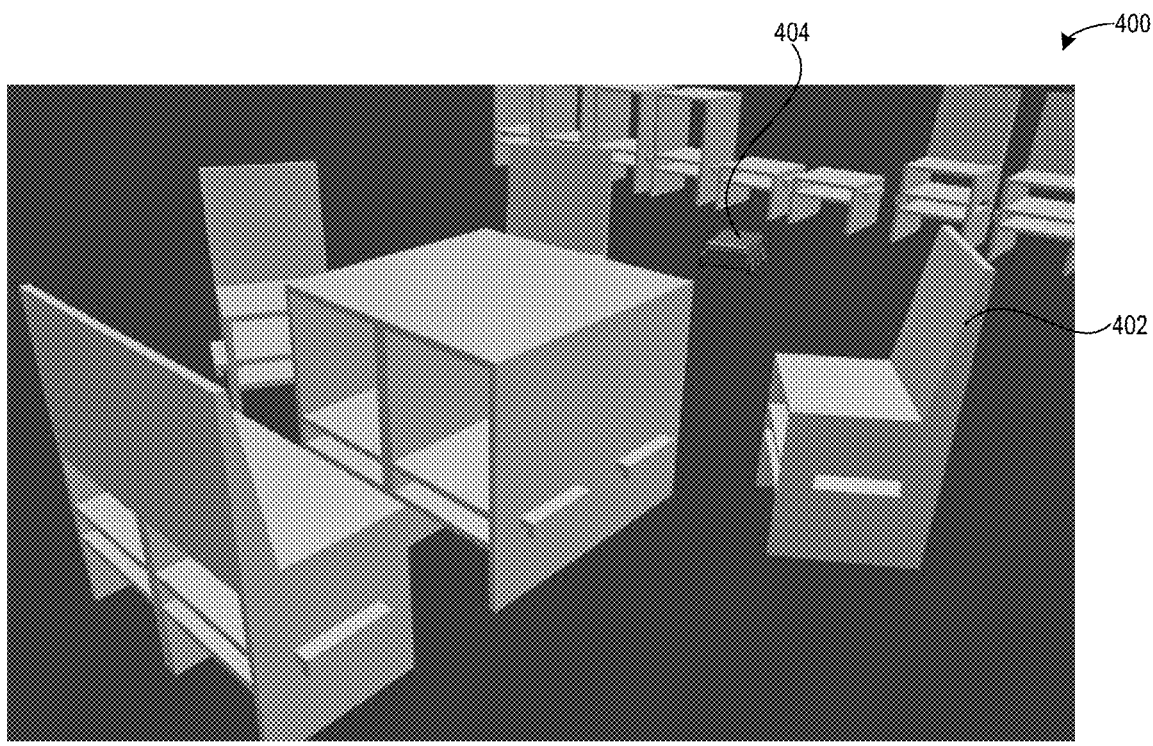
FIG. 4A presents an exemplary layout of a physical space in the real world, in accordance with an embodiment of the present application.

FIG. 4A presents an exemplary layout of a physical space 400 in the real world, in accordance with an embodiment of the present application. Physical space 400 can include a variety of mobile components, such as the materialization props depicted above in FIGS. 3A-3D. For example, physical space 402 can include materialization props which are set up as three chairs (including a materialization prop 402) and a bench with a back arranged as seating around a table. Physical space 402 can also include a mobile robotic device 404.

In physical space 402, mobile robotic device, along with several other materialization props, are located in a second physical space separate from the physical space of the set-up materialization props. The system can define, in the physical space, a particular boundary area or distinct areas in a playroom, in which the user is to stay in order to experience the physically configured components, and the system can also render that boundary area in VR, as described below in relation to FIG. 4B.

Figure 4B:
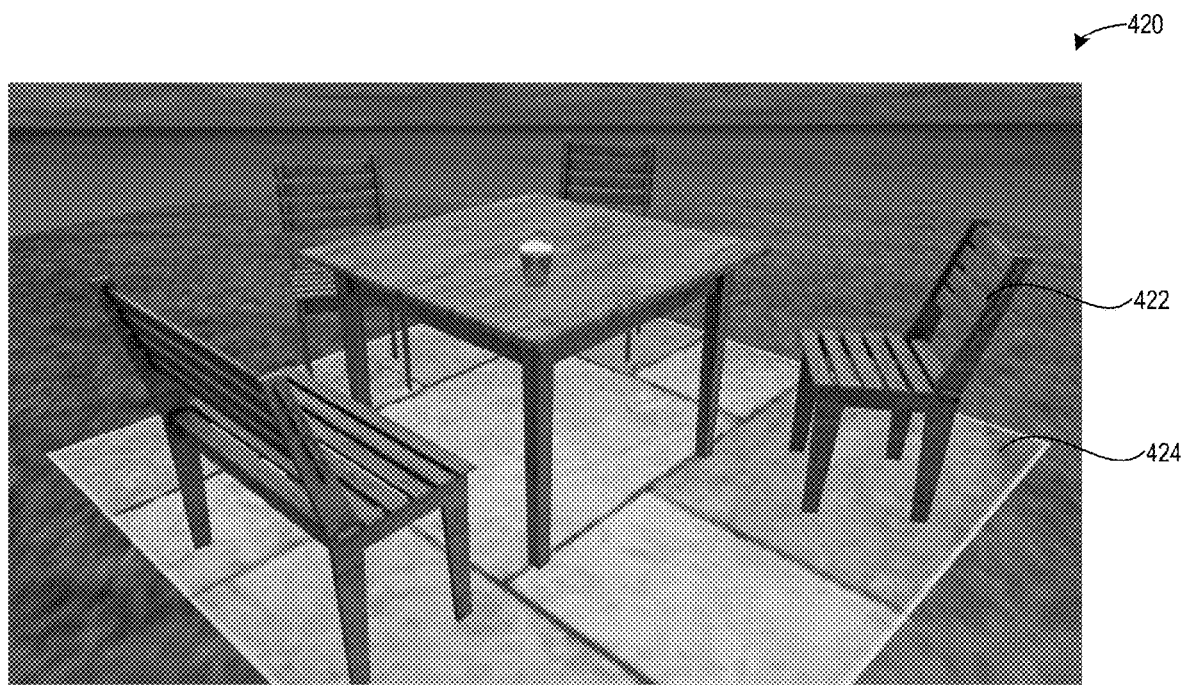
FIG. 4B presents an exemplary VR space, which is a rendering of the configured physical space of FIG. 4A, in accordance with an embodiment of the present application.

FIG. 4B presents an exemplary VR space 420, which is a rendering of the configured physical space 400 of FIG. 4A, in accordance with an embodiment of the present application. VR space 420 can depict a set of outdoor patio furniture which corresponds to and is instantiated by the set of materialization props in physical space 400. For example, materialization prop 402 can be placed into physical space 400 at its specific location based on instructions from a user to configure his VR space 420 in a particular way, which results in the configured physical space 400 and the corresponding rendered VR space 420. Thus, materialization prop 402 instantiates corresponding chair 422 in VR space 420, and allows the user to interact with the real-world (via materialization prop 402, which is rendered as VR chair 422).

Furthermore, VR space 420 can indicate a tiled patio area 424, which can provide a boundary area within which the user may "play" and perform real-world interaction with the instantiated materialization props as rendered in VR. This allows the user to avoid physically bumping into non-rendered physical components in the room, such as mobile robotic device 404 and the remaining materials props which are not set up or configured, and also allows the mobile robotic device to stay in relatively close proximity in order to effectuate dynamic re-configuration of the room and the physical components in the room.

In addition, as described above in relation to FIGS. 1A-1C, physical space 400 can include sensory-generating devices, which can produce sensory information as indicated in instructions from the user's virtual device. For example, as part of the instructions to configure the outdoor patio furniture setup of VR space 420, the user can configure instructions to include the scent of freshly mown grass. An aroma generator (not shown) can produce an aroma similar to the smell of freshly mown grass, and can release the aroma or scent as part of executing the instructions, and subsequently rendering the VR imagery in VR space 420. In some embodiments, the user does not need to specifically configure a sensory element. Instead, the user can simply select the VR environment, and the system can automatically provide the corresponding sensory elements.

Method for Facilitating Real-World Interaction with Virtual Reality

Figure 5A:
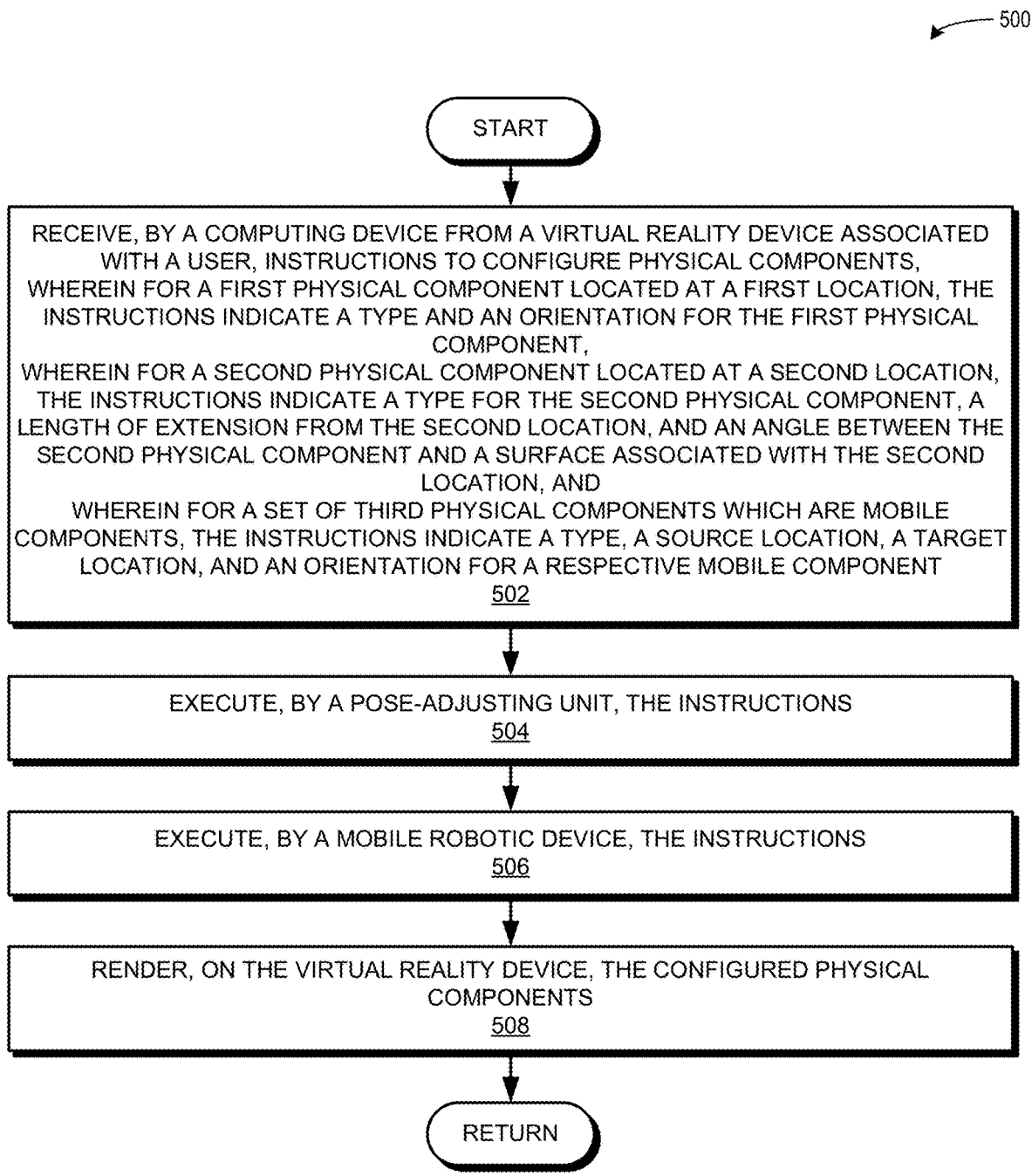
FIG. 5A presents a flow chart illustrating a method for facilitating real-world interaction with virtual reality, in accordance with an embodiment of the present application.

FIG. 5A presents a flow chart 500 illustrating a method for facilitating real-world interaction with virtual reality, in accordance with an embodiment of the present application. During operation, the system receives, by a computing device from a virtual reality device associated with a user, instructions to configure physical components, wherein: for a first physical component at a first location, the instructions indicate a type and an orientation for the first physical component; for a second physical component located at a second location, the instructions indicate a type for the second physical component, a length of extension from the second location, and an angle between the second physical component and a surface associated with the second location; and for a set of third physical components which are mobile components, the instructions indicate a type, a source location, a target location, and an orientation for a respective mobile component (operation 502). The system executes, by a pose-adjusting unit, the instructions (operation 504). For example, a first pose-adjusting unit associated with the first physical component can execute the instructions indicated for the first physical component, and a second pose-adjusting unit associated with the second physical component can execute the instructions indicated for the second physical component. The system can include a separate pose-adjusting unit associated with each of the first and second physical components. In some embodiments, the pose-adjusting unit is a single unit which can control and is associated with all of the physical components (e.g., both the first and second physical components). A pose-adjusting unit can be associated with one or more physical components, and can itself by controlled by or via a controller device.

The system also executes, by a mobile robotic device, the instructions (operation 506). For example, the mobile robotic device can execute the instructions indicated for the set of third physical components (the mobile components). Subsequently, the system renders, on the virtual reality device, the configured physical components (operation 508).

Figure 5B:
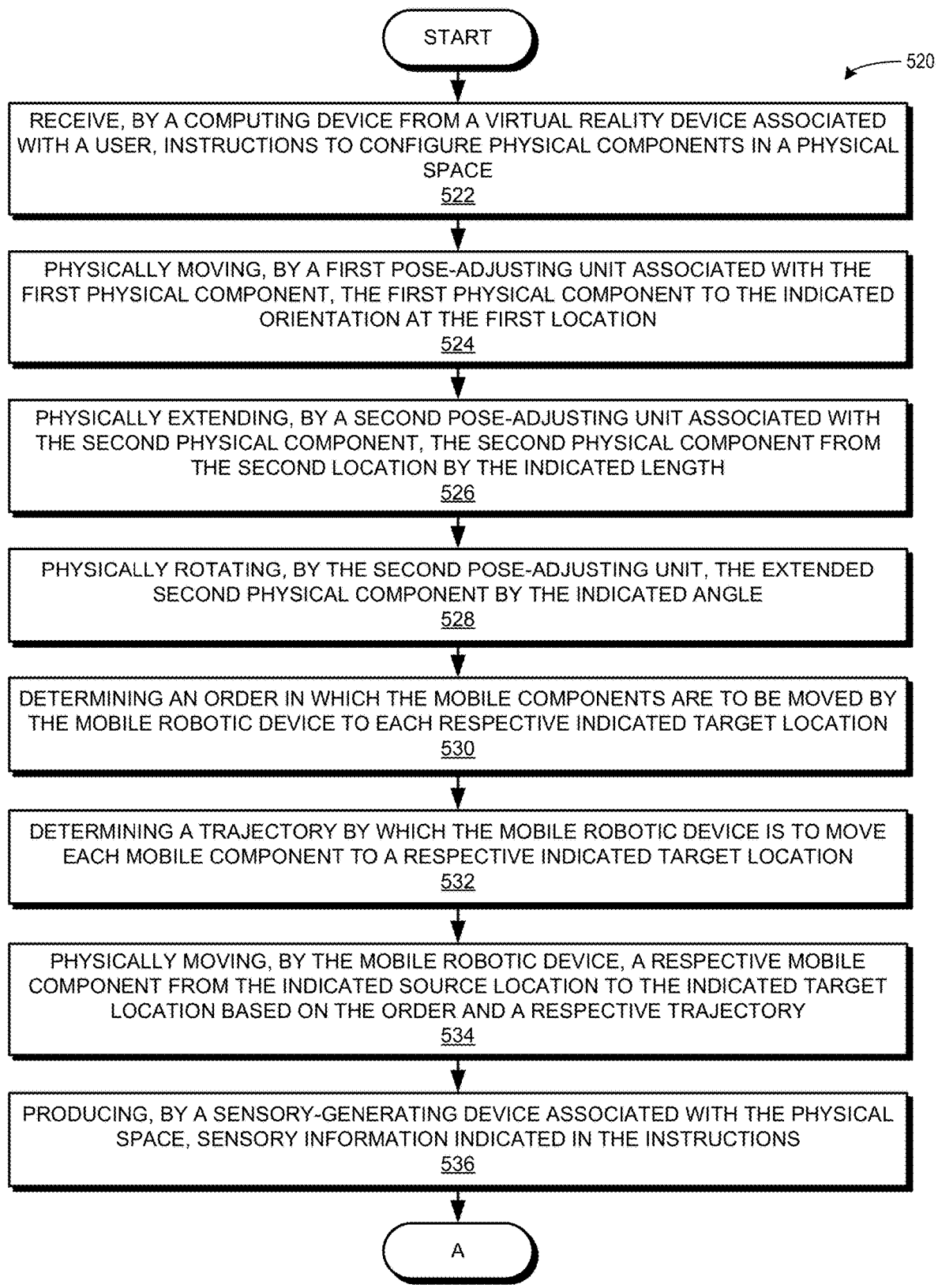
FIG. 5B presents a flow chart illustrating a method for facilitating real-world interaction with virtual reality, in accordance with an embodiment of the present application.

FIG. 5B presents a flow chart 520 illustrating a method for facilitating real-world interaction with virtual reality, in accordance with an embodiment of the present application. During operation, the system receives, by a computing device from a virtual reality device associated with a user, instructions to configure physical components in a physical space (operation 522). Similar to operation 502: for a first physical component at a first location, the instructions indicate a type and an orientation for the first physical component; for a second physical component located at a second location, the instructions indicate a type for the second physical component, a length of extension from the second location, and an angle between the second physical component and a surface associated with the second location; and for a set of third physical components which are mobile components, the instructions indicate a type, a source location, a target location, and an orientation for a respective mobile component. The first and second physical components can be located in a physical space, and can be pre-configured at certain locations (e.g., mounted to a wall and to be subsequently lowered, built into an underground space and to be subsequently raised from the floor, etc.)

The system physically moves, by a first pose-adjusting unit, the first physical component to the indicated orientation at the first location (operation 524). The system physically extends, by a second pose-adjusting unit, the second physical component from the second location by the indicated length (operation 526). The system physically rotates, by the second pose-adjusting unit, the extended second physical component by the indicated angle (operation 528).

The system determines an order in which the mobile components are to be moved by the mobile robotic device to each respective indicated target location (operation 530). The system determines a trajectory by which the mobile robotic device is to move each mobile component to a respective indicated target location (operation 532). The system physically moves, by the mobile robotic device, a respective mobile component from the indicated source location to the indicated target location based on the order and a respective trajectory (operation 534). The system also produces, by a sensory-generating device associated with the physical space, sensory information indicated in the instructions (operation 536). The operation continues as described at Label A of FIG. 5C.

Figure 5C:
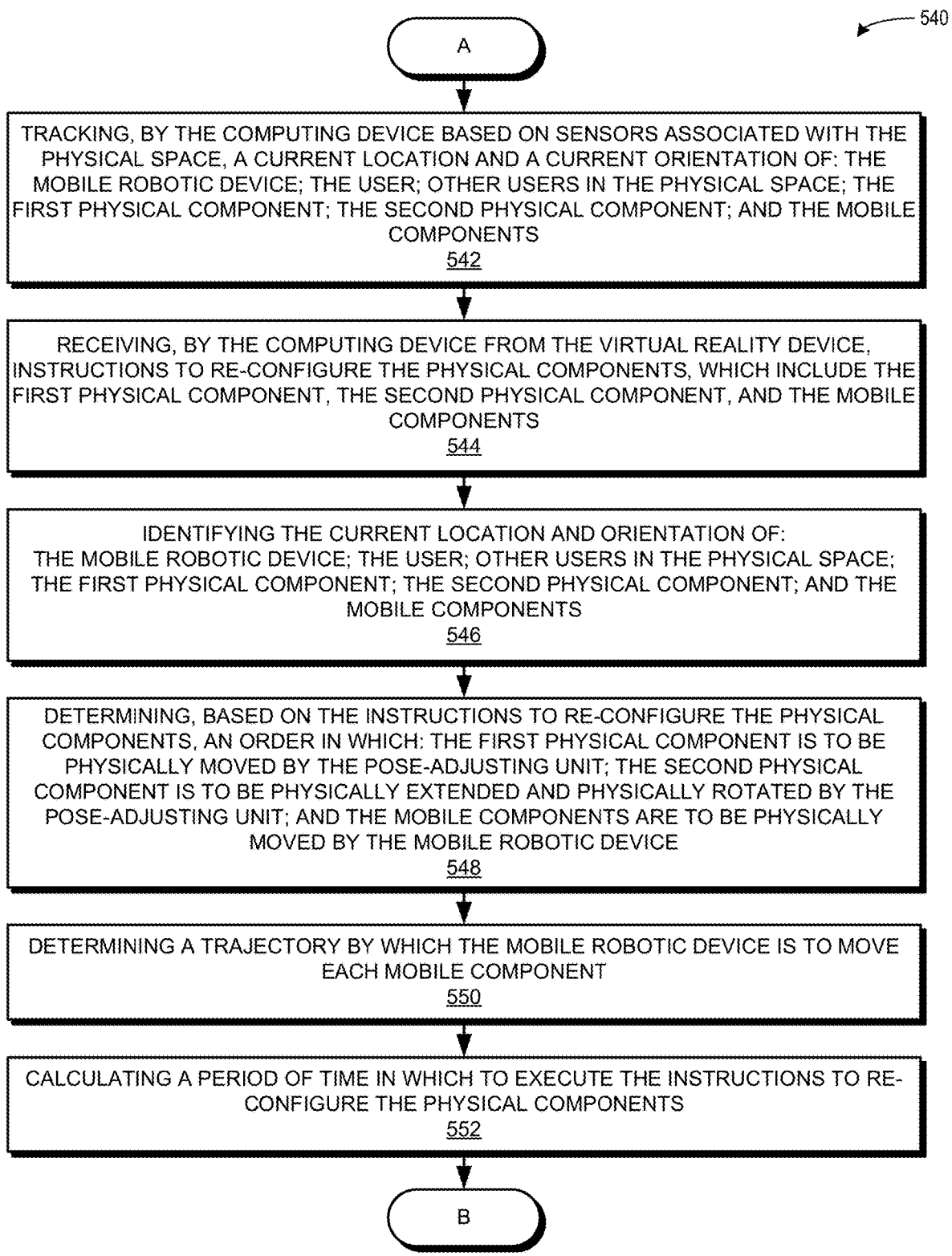
FIG. 5C presents a flow chart illustrating a method for facilitating real-world interaction with virtual reality, including dynamically re-configuring physical components, in accordance with an embodiment of the present application.

FIG. 5C presents a flow chart illustrating a method 540 for facilitating real-world interaction with virtual reality, including dynamically re-configuring physical components, in accordance with an embodiment of the present application. During operation, the system tracks, by the computing device based on sensors associated with the physical space, a current location and a current orientation of: the mobile robotic device; the user; other users in the physical space; the first physical component; the second physical component; and the mobile components (operation 542). The system receives, by the computing device from the virtual reality device, instructions to re-configure the physical components, which include the first physical component, the second physical component, and the mobile components (operation 544). The system identifies the current location and orientation of: the mobile robotic device; the user; other users in the physical space; the first physical component; the second physical component; and the mobile components (operation 546).

The system determines, based on the instructions to re-configure the physical components, an order in which: the first physical component is to be physically moved by the pose-adjusting unit; the second physical component is to be physically extended and physically rotated by the pose-adjusting unit; and the mobile components are to be physically moved by the mobile robotic device (operation 548). The system determines a trajectory by which the mobile robotic device is to move each mobile component (operation 550). The system calculates a period of time in which to execute the instructions to re-configure the physical components (operation 552), and the operation continues as described at Label B of FIG. 5D

Figure 5D:
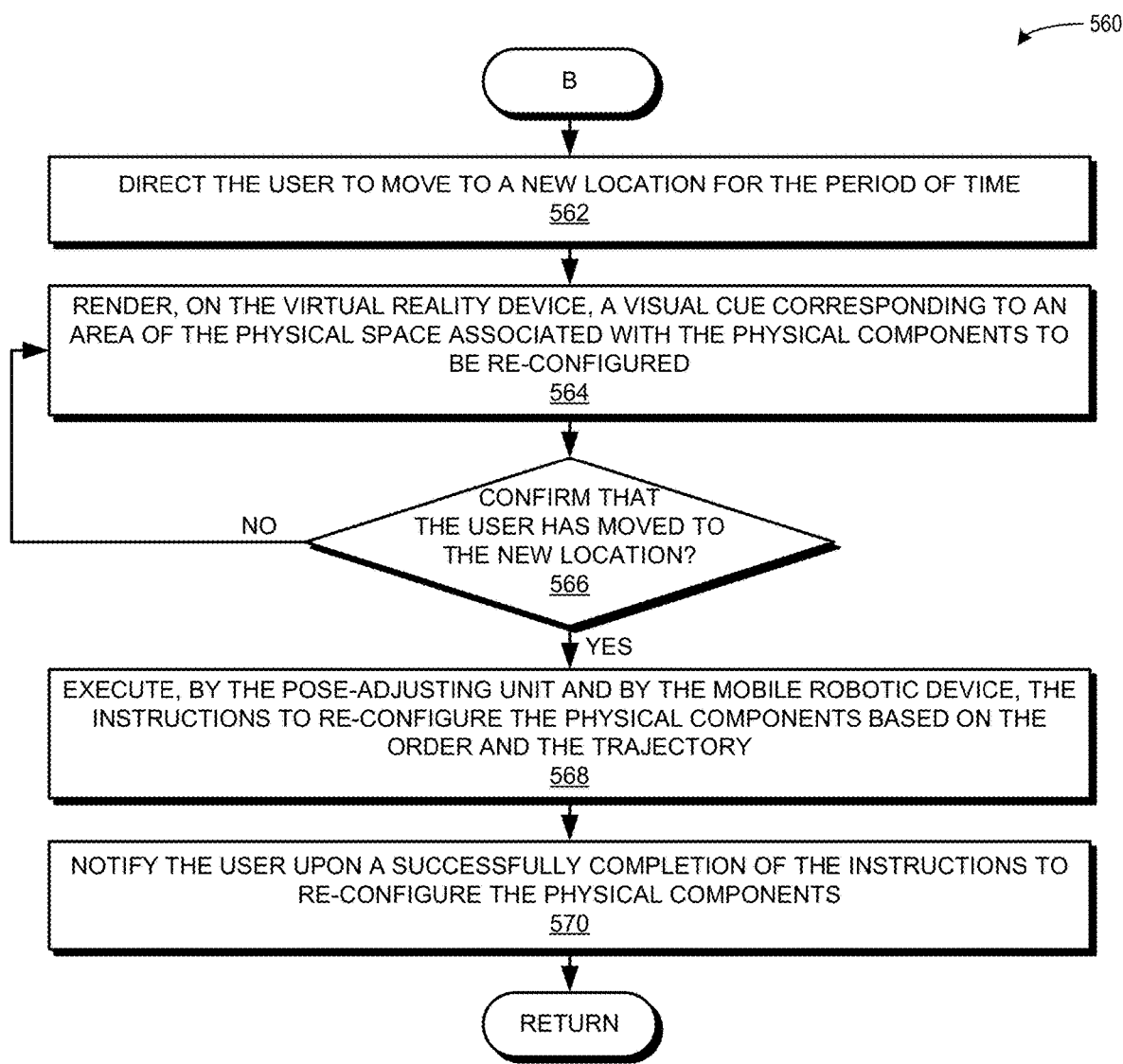
FIG. 5D presents a flow chart illustrating a method for facilitating real-world interaction with virtual reality, including dynamically re-configuring physical components, in accordance with an embodiment of the present application.

FIG. 5D presents a flow chart 560 illustrating a method for facilitating real-world interaction with virtual reality, including dynamically re-configuring physical components, in accordance with an embodiment of the present application. During operation, the system directs the user to move to a new location for the period of time (operation 562). The new location can be in the same physical space (e.g., in the playroom), or can be in a different physical space. The system renders, on the virtual reality device, a visual cue corresponding to an area of the physical space associated with the physical components to be re-configured (operation 564). If the system does not confirm that the user has moved to the new location (decision 566), the operation continues at operation 564.

If the system does confirm that the user has moved to the new location (decision 566), the system executes, by the pose-adjusting unit and by the mobile robotic device, the instructions to re-configure the physical components based on the order and the trajectory (operation 568). The system notifies the user when the instructions to re-configure the physical components have been completed (operation 570), and the user can resume his real-world interaction in VR with the re-configured physical components in the physical space.

In some embodiments, instead of directing the user to move to a new location (as in operation 562), the system directs the user to remain in his current location (e.g., seated on a chair in the playroom), and the decision of operation 566 is based on confirming whether the user has remained in his current location. Furthermore, if the user does not remain in his "current" location (or does not stay in the "new" location, as in operations 562 and 566), the system can pause the execution of the instructions and send to the user a message which reminds the user to return to the prior "current" (or "new") location. In some instances, if the system is partially finished with executing the instructions, the system can determine the current configuration of the room (e.g., the current location and orientation of the physical components to be re-configured), and the system can determine an updated location to which the user can move (rather than returning to the prior "current" (or "new") location).

Additional Features and Embodiments

The embodiments described herein can include a first embodiment which covers the pre-configured physical components and the pose-adjusting units (as described in relation to FIGS. 1A, 2A, and 2B), and a second embodiment which covers the mobile components and the mobile robotic device (as described in relation to FIGS. 1B, 1C, 3A-3D, and 4A-4B. These two approaches may be implemented independently or together. In another embodiment, the system can include both the first and the second embodiments, such that the system allows the user to configure both the pre-configured physical components and the mobile components.

The described embodiments provide a set of physical affordances. The described system can provide physical support for the user, e.g., to sit or lean on a physical component. The described system can also provide texture on a physical component, such as providing a hard or a cushioned panel for the user on which to sit, which may correspond, respectively, to an outdoor bench seat or a couch cushion. The described system can also allow a user to collide into an object (which constrains the user's motion) and to obscure other objects from the user's view (which limits the user's line of sight).

The described embodiments can also provide multiple, compassable layers of physical and digital augmentation, including digital layers overlaid onto permanent physical structures in the room and modifiable physical structures. The modifiable physical structures can include whole room re-configuration, such as moveable walls, floors, partitions, dividers, ceilings, etc. The modifiable physical structures can also include a set of stock physical props (like switches and appliances) which can be moved by robotic processes or devices.

The physical and digital augmentation can also include decorative/functional physical objects/props (e.g., from three-dimensional printing) which are placed over, near, or on other physical structures and propr. For example, functional digital or physical objects with buttons and other user interface elements can be used to adjust the properties of both digital and physical structures/objects/props. That is, the physical components which can be configured in the physical space can include UI elements which allow the user to adjust properties of the configured object. For example, the VR scene can include a VR-rendered television screen (with no corresponding physical component) which can be controlled in real time by a VR-rendered remote control (with a corresponding physical component, i.e., where the remote control is a configurable physical object in the playroom). While using his VR device, the user can physically pick up the physical remote control and rotate a knob (or push a button or perform any action using a UI element on the VR device with a corresponding physical feature) to change the channel on the television. The system can track the user's touch or commands generated on the physical remote control, render the feedback correspondingly on the VR object in the VR scene (e.g., as a flashing button), and display a different channel on the VR-rendered television screen.

Exemplary Computer and Communication System

Figure 6:
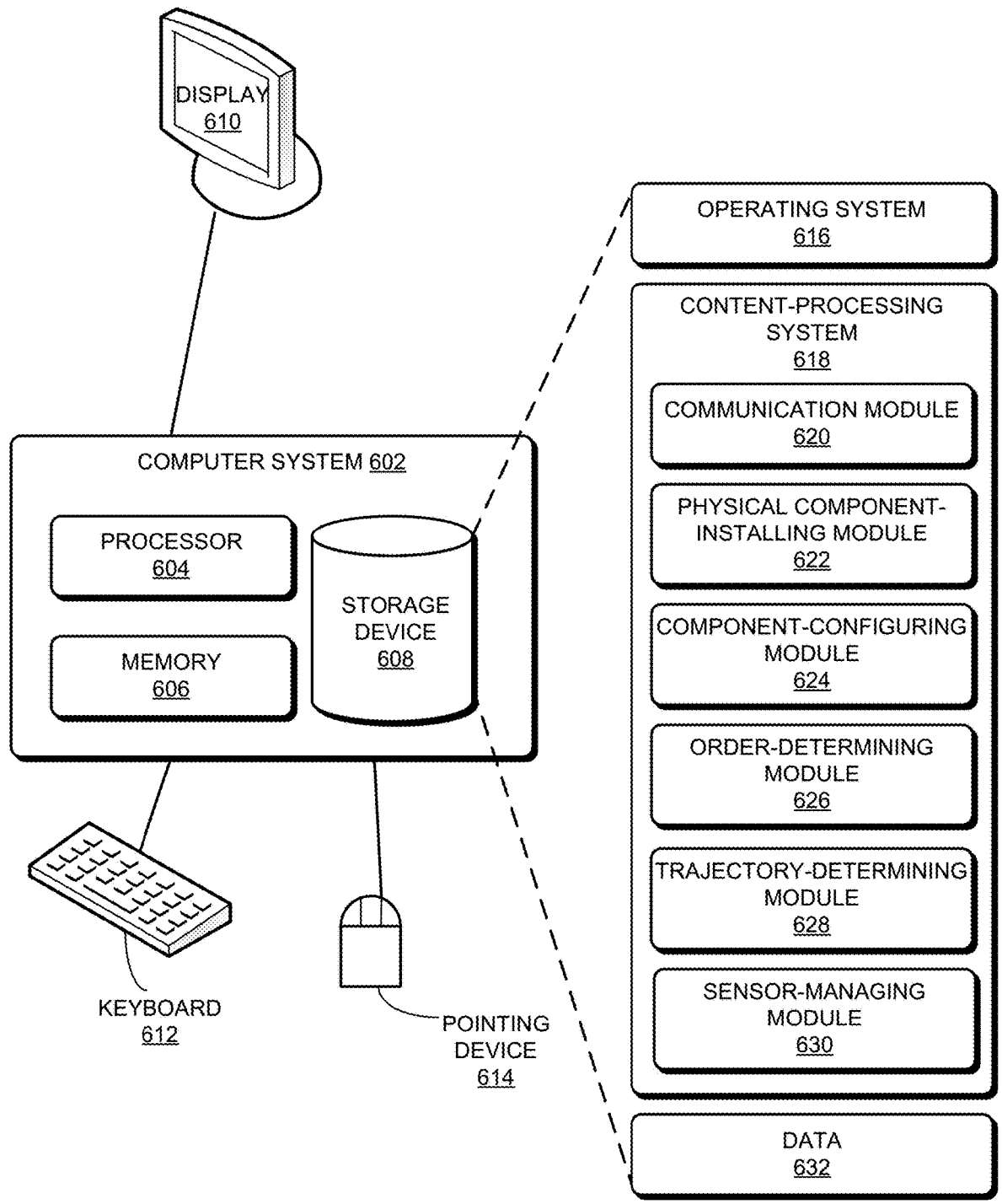
FIG. 6 illustrates an exemplary distributed computer and communication system that facilitates real-world interaction with virtual reality, in accordance with an embodiment of the present application.

FIG. 6 illustrates an exemplary distributed computer and communication system 602 that facilitates real-world interaction with virtual reality, in accordance with an embodiment of the present application. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 632.

Content-processing system 618 can include instructions, which when executed by computer system 602, can cause computer system 602 to perform methods and/or processes described in this disclosure. Specifically, content-processing system 618 may include instructions for sending and/or receiving/obtaining data packets to/from other network nodes across a computer network (communication module 620). A data packet can include a request, data, instructions, parameters, a message, and a notification.

Content-processing system 618 can further include instructions for receiving, by a computing device from a virtual reality device associated with a user, instructions to configure physical components (communication module 620). Content-processing system 618 can include instructions for executing, by a pose-adjusting unit, the instructions (component-configuring module 624).

Content-processing system 618 can include instructions for determining an order in which the mobile components are to be moved by the mobile robotic device to each respective indicated target location (order-determining module 626). Content-processing system 618 can include instructions for determining a trajectory by which the mobile robotic device is to move each mobile component to a respective indicated target location (trajectory-determining module 628).

Content-processing system 618 can include instructions for tracking, by the computing device based on sensors associated with the physical space, a current location and a current orientation of: the mobile robotic device; the user; other users in the physical space; the first physical component; the second physical component; and the mobile components (sensor-managing module 630).

Content-processing system 618 can include instructions for receiving, by the computing device from the virtual reality device, instructions to re-configure the physical components, which include the first physical component, the second physical component, and the mobile components (communication module 620). Content-processing system 618 can include instructions for executing the instructions to re-configure the physical components (component-configuring module 624). Content-processing system 618 can include instructions for installing the first physical component at the first location in a physical space or the second physical component at the second location in the physical space (physical component-installing module 622).

Data 630 can include any data that is required as input or that is generated as output by the methods and/or processes described in this disclosure. Specifically, data 630 can store at least: instructions; instructions to configure physical components; a location; an orientation; a type; a length; a length of extension from a location; an angle; an angle between a physical component and a surface associated with a location; an indicator or identifier of a pose-adjusting unit, a sensory-generating device, or a mobile robotic device; sensory information; a source location; a target location; an indicator of a first physical space; an indicator of a second physical space; an order; a trajectory; a tracked current location or current orientation; an indicator of a sensor; data gathered or obtained from a sensor; a period of time; and an indicator of a visual cue.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating real-world interaction with virtual reality, the method comprising:
   receiving, by a computing device from a virtual reality device associated with a user, instructions to configure physical components,
   wherein for a first physical component at a first location, the instructions indicate a type and an orientation for the first physical component, and
   wherein for a second physical component located at a second location, the instructions indicate a type for the second physical component, a length of extension from the second location, and an angle between the second physical component and a surface associated with the second location;
   executing, by a pose-adjusting unit, the instructions, which involves:
   physically moving the first physical component to the indicated orientation at the first location;
   physically extending the second physical component from the second location by the indicated length; and
   physically rotating the extended second physical component by the indicated angle; and
   rendering, on the virtual reality device, the configured physical components.

2. The method of claim 1, wherein prior to receiving the instructions to configure the physical components:
   the first physical component is installed or mounted at the first location in a physical space; and
   the second physical component is installed at the second location in the physical space.

3. The method of claim 1, wherein the instructions are sent by the virtual reality device and are sent in response to the user moving, using the virtual reality device, virtual reality objects which correspond to the physical components.

4. The method of claim 1,
wherein the instructions further indicate features for the physical components based on the type for the physical components,
wherein rendering the configured physical components involves rendering, on the virtual reality device, the included features for the physical components,
wherein the instructions further indicate sensory information to be produced via a sensory-generating device associated with a physical space,
wherein the physical space is associated with the physical components and includes one or more of a speaker, an aroma generator, a vibration generator, and a device which can change or control a temperature, humidity, or light content of the physical space, and
wherein the method further comprises producing, by the sensory-generating device, the indicated sensory information.

5. The method of claim 1,
wherein the first physical component and the second physical component are located in a physical space,
wherein for a set of third physical components which are mobile components, the instructions indicate a type, a source location, a target location, and an orientation for a respective mobile component, and
wherein the method further comprises:
executing, by a mobile robotic device, the instructions, which involves physically moving the respective mobile component from the indicated source location to the indicated target location.

6. The method of claim 5, wherein the source location and the target location are one or more of:
a location in the physical space; and
a location which is in a second physical space distinct from the physical space.

7. The method of claim 5, further comprising:
determining an order in which the mobile components are to be moved by the mobile robotic device to each respective indicated target location; and
determining a trajectory by which the mobile robotic device is to move each mobile component to a respective indicated target location,
wherein physically moving the respective mobile component from the indicated source location to the indicated target location is based on the order and a respective trajectory.

8. The method of claim 5, further comprising:
tracking, by the computing device based on sensors associated with the physical space, a current location and a current orientation of: the mobile robotic device; the user; other users in the physical space; the first physical component; the second physical component; and the mobile components.

9. The method of claim 8, wherein the sensors include one or more of:
cameras mounted in a fixed position on the walls, floor, ceiling, or other surface of the physical space;
moveable cameras in the physical space;
sensors associated with or worn by the user; and
any sensor or device which can monitor movement of any physical component, object, or user in the physical space.

10. The method of claim 5, further comprising dynamically re-configuring the physical components, which involves:
receiving, by the computing device from the virtual reality device, instructions to re-configure the physical components, which include the first physical component, the second physical component, and the mobile components;
identifying a current location and a current orientation of: the mobile robotic device; the user; other users in the physical space; the first physical component; the second physical component; and the mobile components;
determining, based on the instructions to re-configure the physical components, an order in which: the first physical component is to be physically moved by the pose-adjusting unit; the second physical component is to be physically extended and physically rotated by the pose-adjusting unit; and the mobile components are to be physically moved by the mobile robotic device;
determining a trajectory by which the mobile robotic device is to move each mobile component;
calculating a period of time in which to execute the instructions to re-configure the physical components;
directing the user to move to a new location for the period of time;
rendering, on the virtual reality device, a visual cue corresponding to an area of the physical space associated with the physical components to be re-configured;
in response to confirming that the user has moved to the new location, executing, by the pose-adjusting unit and by the mobile robotic device, the instructions to re-configure the physical components based on the order and the trajectory; and
notifying the user when the instructions to re-configure the physical components have been completed.

11. A computer system for facilitating real-world interaction with virtual reality, the system comprising:
a processor; and
a storage device storing instructions that when executed by the processor cause the processor to perform a method, the method comprising:
receiving, by a computing device from a virtual reality device associated with a user, instructions to configure physical components,
wherein for a first physical component at a first location, the instructions indicate a type and an orientation for the first physical component, and
wherein for a second physical component located at a second location, the instructions indicate a type for the second physical component, a length of extension from the second location, and an angle between the second physical component and a surface associated with the second location;
executing, by a pose-adjusting unit, the instructions, which involves:
physically moving the first physical component to the indicated orientation at the first location;
physically extending the second physical component from the second location by the indicated length; and
physically rotating the extended second physical component by the indicated angle; and
rendering, on the virtual reality device, the configured physical components.

12. The computer system of claim 11, wherein prior to receiving the instructions to configure the physical components:
the first physical component is installed or mounted at the first location in a physical space; and
the second physical component is installed at the second location in the physical space.

13. The computer system of claim 11, wherein the instructions are sent by the virtual reality device and are sent in response to the user moving, using the virtual reality device, virtual reality objects which correspond to the physical components.

14. The computer system of claim 1,
wherein the instructions further indicate features for the physical components based on the type for the physical components,
wherein rendering the configured physical components involves rendering, on the virtual reality device, the included features for the physical components,
wherein the instructions further indicate sensory information to be produced via a sensory-generating device associated with a physical space,
wherein the physical space is associated with the physical components and includes one or more of a speaker, an aroma generator, a vibration generator, and a device which can change or control a temperature, humidity, or light content of the physical space, and
wherein the method further comprises producing, by the sensory-generating device, the indicated sensory information.

15. The computer system of claim 11,
wherein the first physical component and the second physical component are located in a physical space,
wherein for a set of third physical components which are mobile components, the instructions indicate a type, a source location, a target location, and an orientation for a respective mobile component, and
wherein the method further comprises:
executing, by a mobile robotic device, the instructions, which involves physically moving the respective mobile component from the indicated source location to the indicated target location.

16. The computer system of claim 15, wherein the source location and the target location are one or more of:
a location in the physical space; and
a location which is in a second physical space distinct from the physical space.

17. The computer system of claim 15, wherein the method further comprises:
determining an order in which the mobile components are to be moved by the mobile robotic device to each respective indicated target location; and
determining a trajectory by which the mobile robotic device is to move each mobile component to a respective indicated target location,
wherein physically moving the respective mobile component from the indicated source location to the indicated target location is based on the order and a respective trajectory.

18. The computer system of claim 15, wherein the method further comprises:
tracking, by the computing device based on sensors associated with the physical space, a current location and a current orientation of: the mobile robotic device; the user; other users in the physical space; the first physical component; the second physical component; and the mobile components.

19. The computer system of claim 18, wherein the sensors include one or more of:
cameras mounted in a fixed position on the walls, floor, ceiling, or other surface of the physical space;
moveable cameras in the physical space;
sensors associated with or worn by the user; and
any sensor or device which can monitor movement of any physical component, object, or user in the physical space.

20. The computer system of claim 15, wherein the method further comprises dynamically re-configuring the physical components, which involves:
receiving, by the computing device from the virtual reality device, instructions to re-configure the physical components, which include the first physical component, the second physical component, and the mobile components;
identifying a current location and a current orientation of: the mobile robotic device; the user; other users in the physical space; the first physical component; the second physical component; and the mobile components;
determining, based on the instructions to re-configure the physical components, an order in which: the first physical component is to be physically moved by the pose-adjusting unit; the second physical component is to be physically extended and physically rotated by the pose-adjusting unit; and the mobile components are to be physically moved by the mobile robotic device;
determining a trajectory by which the mobile robotic device is to move each mobile component;
calculating a period of time in which to execute the instructions to re-configure the physical components;
directing the user to move to a new location for the period of time;
rendering, on the virtual reality device, a visual cue corresponding to an area of the physical space associated with the physical components to be re-configured;
in response to confirming that the user has moved to the new location, executing, by the pose-adjusting unit and by the mobile robotic device, the instructions to re-configure the physical components based on the order and the trajectory; and
notifying the user when the instructions to re-configure the physical components have been completed.

* * * * *